April 14, 1931.  J. G. RIEFF  1,800,905
LAWN TOOL
Filed Oct. 25, 1928
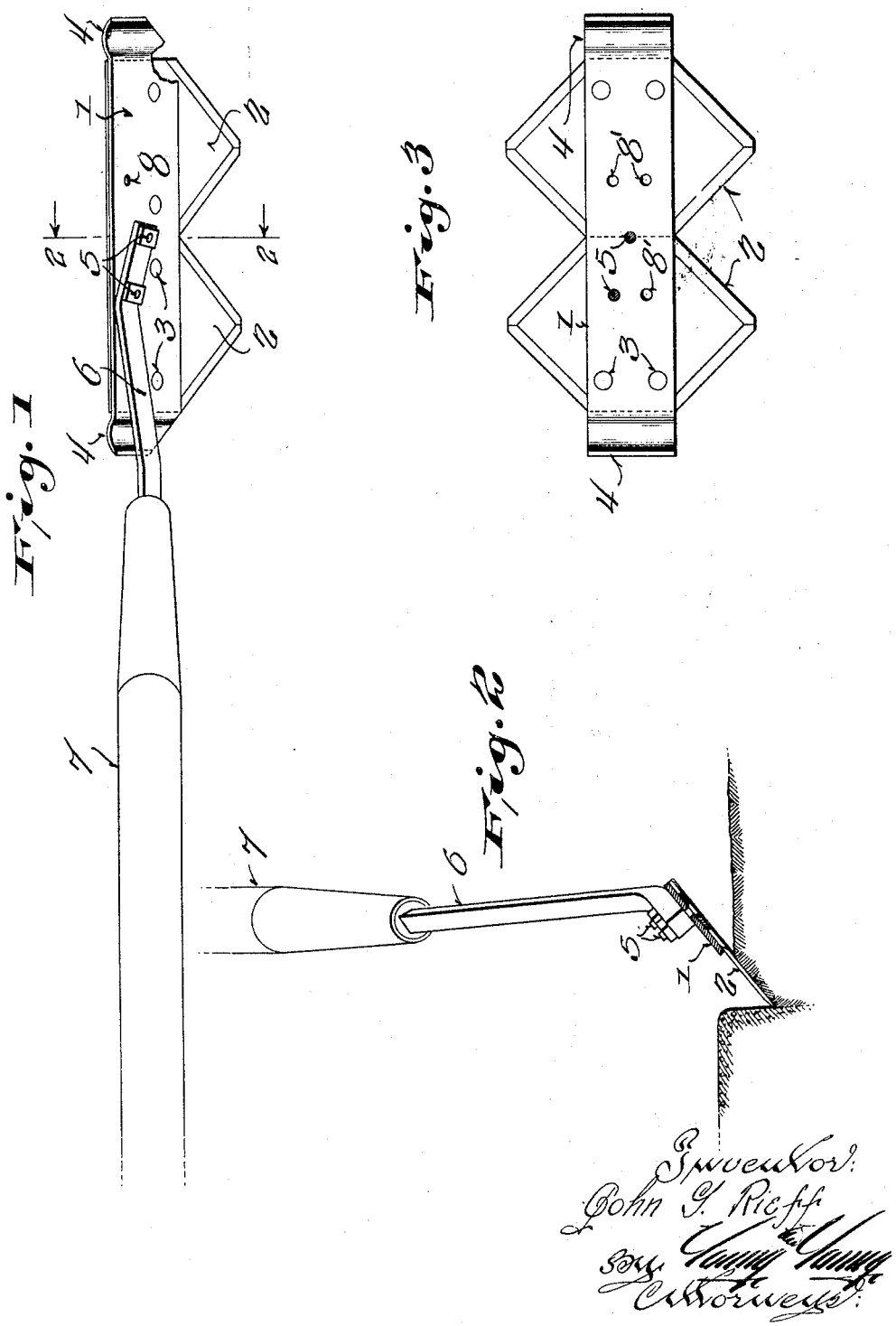
Inventor:
John G. Rieff Patented Apr. 14, 1931

1,800,905

UNITED STATES PATENT OFFICE

JOHN G. RIEFF, OF LONDON, WISCONSIN

LAWN TOOL

Application filed October 25, 1928. Serial No. 314,968.

This invention pertains to a lawn tool, and has primarily for its object to provide a comparatively simple, inexpensive, and efficient tool, capable of various uses, such as the guttering of lawn adjacent sidewalks or other obstructions and the digging of dandelions and other weeds, in addition to cutting or trimming grass or other growth.

Another object is to provide a tool whereby a slight variation in the angle of the blade during the cutting operation allows the cutting of a gutter of any desired bevel or width.

Incidental to the foregoing, a more specific object resides in the provision of a tool utilizing conventional sickle blades secured to a base plate to which is attached an inclined handle angularly offset with relation to said base plate.

With the above and other objects in view, which will appear as the description proceeds, the invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

In the drawings, Figure 1 is a plan perspective of a tool constructed in accordance with the present invention;

Figure 2 is a transverse section taken on the line 2—2 of Figure 1 illustrating the operation of the tool; and Figure 3 is a detail plan view of a modification with the handle removed.

Referring now more particularly to the accompanying drawings, the numeral 1 designates a base plate to which are attached a pair of sickle blades 2 by means of rivets 3 or other suitable securing devices. The ends of the base plate, which extend beyond the transverse edges of the abutted sickle blades, are turned outwardly to form guards 4 which engage the ground and prevent the blades from digging into the same except at their cutting edges.

Secured to the base plate 1 by means of bolts 5 is an angular shank 6 which carries the usual manipulating handle 7, the handle being inclined upwardly with relation to the plate 1. As disclosed in the drawings, the shank 6 is secured to the plate 1 at an angle to the vertical plane of its longitudinal edge. Thus, if the blades are tilted to an operative angle of approximately 45 degrees, the handle will lie in a substantially vertical plane, which materially facilitates the operation of the tool.

As best shown in Figure 1, it will be noted that the extreme end of the shank is attached to the base plate 1 centrally of its ends, while the adjacent bolt 5 passes through one of a pair of offset openings 8. The purpose of this is to permit the handle to be attached to the base plate in one of two positions with relation to the cutting blades, to accommodate a left or right hand operator.

From the drawings, the operation of the device will be quite apparent, in that it is merely necessary to tilt the cutting blades to any desired angle, placing the same against the edge of the sidewalk or other obstruction, which serves to guide the blades and effects a straight even cut of any desired width or level in actuating the device, the blades can be pulled through the soil toward the operator or pushed away from him as the case may require.

In digging dandelions or weeds, the pointed end of the forward sickle blade can be readily inserted into the ground in much the same manner as a knife or other cutting tool, thus severing the root or weed below the surface of the ground. Obviously, the double angular cutting edges of the sickle blades allow the tool to be actuated in either longitudinal direction, thus materially increasing the life of the cutting edges and also rendering it possible to attach the handle in one of two positions for right or left hand operators.

It will also be quite apparent that the tool can be used as an ordinary sickle in trimming grass or other objectionable growth.

The modification illustrated in Figure 3 differs from that form shown in Figure 1 only in that double sickle blades are utilized, thus increasing the life of the tool. In this form, the attaching holes 8' in the base plate are arranged to permit shifting of the handle to different positions, whereby either a left or right hand operator may obtain the full benefit of both cutting edges.

From the foregoing, it will be seen that a very simple and efficient tool has been provided which utilizes conventional sickle blades and can, therefore, be produced at an extremely low cost. Also, because of the inclined cutting edges of the sickle blades, the device is extremely simple and requires little effort in guttering a lawn, as a shearing action is obtained. Because of the fact that the blades themselves are guided against the sidewalk or obstruction, no particular skill or care is required in order to obtain a straight, uniform cut.

I claim:

1. A lawn tool comprising a base plate provided with outturned ends, a pair of sickle blades secured to said base plate between the outturned ends whereby the outturned ends will limit the penetrating movement of the blades, and an inclined handle secured to said base plate at an angle to the vertical plane of its longitudinal edge.

2. A lawn tool comprising an elongated base plate, a pair of sickle blades secured thereto with their cutting edges projecting beyond one edge of the base plate, a handle member, means for attaching said handle to the base plate upon either side of the transverse center thereof and at an angle to the plane of said base plate, and outwardly turned guards at each end of the base plate to limit the movement of the cutting edges when engaged with the ground.

In testimony that I claim the foregoing I have hereunto set my hand at London, in the county of Dane and State of Wisconsin.

JOHN G. RIEFF.